(12) United States Patent
Wuidart

(10) Patent No.: US 7,937,590 B2
(45) Date of Patent: *May 3, 2011

(54) SECURE IDENTIFICATION WITH BIOMETRIC DATA

(75) Inventor: Luc Wuidart, Pourrieres (FR)

(73) Assignee: STMicroelectronics S.A., Montrouge (FR)

( * ) Notice: Subject to any disclaimer, the term of this patent is extended or adjusted under 35 U.S.C. 154(b) by 1664 days.

This patent is subject to a terminal disclaimer.

(21) Appl. No.: 10/242,519

(22) Filed: Sep. 12, 2002

(65) Prior Publication Data
US 2003/0056122 A1    Mar. 20, 2003

(30) Foreign Application Priority Data
Sep. 14, 2001  (FR) ..................... 01 11920

(51) Int. Cl.
*G06F 21/00*     (2006.01)
(52) U.S. Cl. ...................... 713/186; 713/182
(58) Field of Classification Search ............ 713/185, 713/186, 182; 716/1, 4; 726/20, 18, 17, 726/6, 9, 5; 382/115
See application file for complete search history.

(56) References Cited

U.S. PATENT DOCUMENTS

| 5,280,527 | A | * | 1/1994 | Gullman et al. ............... 713/184 |
| 5,677,989 | A | | 10/1997 | Rabin et al. |
| 5,881,155 | A | * | 3/1999 | Rigal ............................... 380/44 |
| 6,038,666 | A | | 3/2000 | Hsu et al. |
| 6,161,213 | A | * | 12/2000 | Lofstrom .......................... 716/4 |
| 6,182,221 | B1 | | 1/2001 | Hsu et al. |
| 6,211,575 | B1 | * | 4/2001 | Hansford ...................... 257/786 |
| 6,592,032 | B1 | * | 7/2003 | Takaragi et al. ............. 235/382 |
| 6,697,947 | B1 | * | 2/2004 | Matyas et al. ................ 713/182 |
| 6,853,739 | B2 | * | 2/2005 | Kyle ............................. 382/115 |
| 7,178,113 | B2 | * | 2/2007 | Bardouillet et al. ............. 716/1 |
| 2001/0025342 | A1 | * | 9/2001 | Uchida .......................... 713/186 |
| 2003/0149662 | A1 | * | 8/2003 | Shore .............................. 705/39 |

FOREIGN PATENT DOCUMENTS

| EP | 1235189 A1 | * | 8/2002 |
| WO | WO 00/38118 A1 | | 6/2000 |
| WO | WO 00/45551 A1 | | 8/2000 |
| WO | WO 00/65770 A1 | | 11/2000 |

OTHER PUBLICATIONS

French Search Report from French Patent Application No. 01/11920, filed Sep. 13, 2001.

\* cited by examiner

*Primary Examiner* — Edward Zee
*Assistant Examiner* — Kimyen Vu
(74) *Attorney, Agent, or Firm* — Lisa K. Jorgenson; William R. McClellan; Wolf, Greenfield & Sacks, P.C.

(57) ABSTRACT

A secure method and device of identification by biometric data in which digital biometric data obtained by a sensor are combined with an identifier of an integrated circuit chip contained in a device common to the sensor.

9 Claims, 1 Drawing Sheet

SECURE IDENTIFICATION WITH BIOMETRIC DATA

BACKGROUND OF THE INVENTION

1. Field of the Invention

The present invention relates to the identification or authentication of a user of an electronic device by biometric data relative to him. The present invention more specifically relates to portable devices (for example, a smart card or an electronic key) exploiting a biometric identification of a user to allow or not access to any function (for example, the starting of a vehicle, the opening of a port, etc.).

2. Discussion of the Related Art

The biometric data used essentially include the recognition of an iris, a face or a fingerprint. This last application is the most current due to its easy exploitation on portable devices of key ring type or the like.

FIG. 1 very schematically shows, in the form of a block diagram, a conventional example of an architecture of a system of identification by fingerprint recognition.

Such a system essentially includes a sensor 1 of a fingerprint of a finger d laid on a sensitive surface of this sensor. The sensor takes an image of the papillary arrangement of the finger, digitizes it and processes it, to obtain a map of minutiae. The minutiae represent characteristic points of the papillary arrangement enabling considering two fingerprints as identical (generally, it is considered that there is a matching between two fingerprints when the number of identical minutiae in the two papillary arrangements is included between 8 and 17).

The mapping of the minutiae of the current fingerprint is stored (generally, temporarily) in a memory 2, assigned to the current image. This current image is compared by an adapted algorithm (block 3, MATCH) with reference minutia mappings forming templates stored in a database 4 or the like. In the specific application of the present invention to localized or portable identification devices, the reference database is reduced since a small number of users (generally, less than 10) need identification. The algorithmic comparison function 3 provides a result indicative of an authentication or no authentication of the user having laid his finger on the sensor.

A problem which arises in systems of identification by biometric data is linked to the storage of the reference templates. In particular, knowing a reference print stored in database 4, a possible pirate is then able to use the reference print to provide a file adapted to the current image storage block 2 or to comparator 3 to force a proper identification.

The most frequent piracies or "attacks" are the retrieval of the fingerprint as it is captured (at the output of sensor 1) or the copying of the content of a reference print stored in base 4.

It has already been provided to store the print templates in a coded or encrypted manner to make piracy more difficult. This type of coding is used for remotely stored print templates (for example, on a database accessible over a public network of Internet type). However, such a coding provide no satisfactory result and is further very poorly adapted to local authentication. In particular, it is enough for a pirate to know the content of a file, be it encrypted or not, to provide this file to the authentication comparator.

Document WO-A-0042577 describes a method and a device for a secure transmission of biometric authentication data over an Internet-type network. According to this document, a specific identifier is associated to a camera forming an iris image sensor. This identifier specific to the camera is used to scramble the digital biometric data image before its transmission over the network to a distant server. The comparison of the eye prints for authentication is here performed remotely from the sensor, the authentication server having the means necessary to decrypt the image, to compare it to uncrypted templates. A pirate can still deceive the system if he has managed to obtain a copy of a template.

Another problem of systems of identification by biometric data is due to the non-replaceable character (the data are generally said to be non-revocable) of the biometric data (as opposed to a confidential digital code). Accordingly, each time a print has been retrieved by a pirate from a database, the print holder can no longer use it. Since the number of fingers or eyes is limited, the biometric data that can replace a pirated print is limited.

SUMMARY OF THE INVENTION

The present invention aims at providing a secure method and device of identification by biometric data which overcomes the disadvantages of known methods and systems. In particular, the present invention aims at making the reference templates of the biometric files impossible to exploit by a possible pirate.

The present invention also aims at providing a system which is particularly adapted to portable devices.

The present invention also aims at avoiding use of remote servers to identify or authenticate a user.

To achieve these and other objects, the present invention provides a secure method of identification by biometric data including the step of combining digital biometric data obtained by means of a sensor with an identifier of an integrated circuit chip contained in a device common to the sensor, the chip identifier being derived from a physical parameter network.

According to an embodiment of the present invention, said combination is implemented for the storage of reference templates by means of said sensor.

According to an embodiment of the present invention, the comparison of a current biometric image with a reference template is performed after combining the image with said identifier.

The present invention also provides a portable device for authenticating a user based on biometric data, including:

a digital biometric data sensor;

a physical parameter network specific to an integrated circuit chip of the device;

an element for combining an identifier provided by said network with the digital data provided by said sensor;

an element for storing one or several reference templates of the biometric data; and an element for comparing a current datum with one of the reference templates.

According to an embodiment of the present invention, at least the physical parameter network and the scrambler are integrated on a same chip.

The foregoing objects, features and advantages of the present invention, will be discussed in detail in the following non-limiting description of specific embodiments in connection with the accompanying drawings.

DETAILED DESCRIPTION

Figure 1:
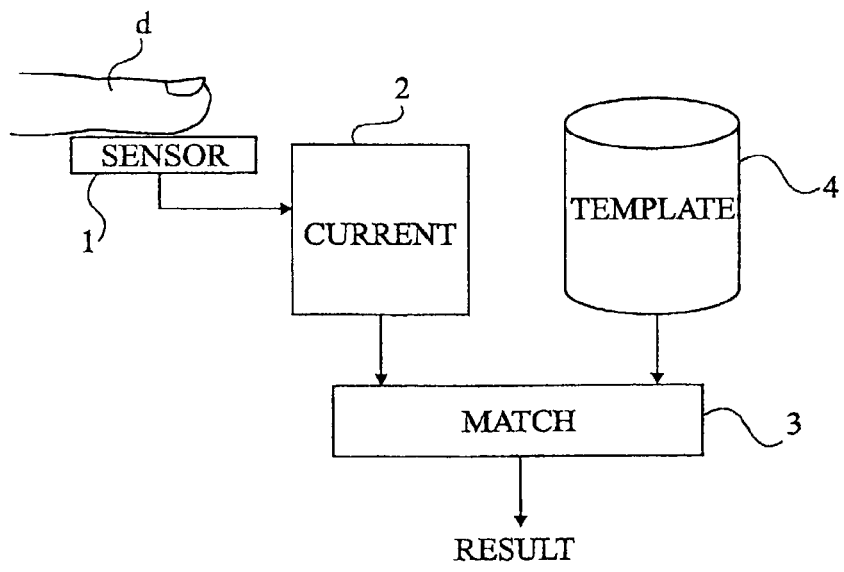
FIG. 1, previously described, very schematically shows in the form of blocks a conventional system of identification by comparison of biometric data.

The same elements have been referred to with the same reference numbers. For clarity, only those method steps and those device components that are necessary to the understanding of the present invention have been shown in the drawings and will be described hereafter. In particular, the obtaining of the biometric images and the digitizing for comparison are known. Further, the exploitation of the identification result (access authorization, starting, etc.) is not modified by the implementation of the present invention.

A feature of the present invention is to combine, within a portable device of identification or authentication by biometric data comparison, the actual biometric data file with an identifier specific to the sensor, more specifically, specific to an integrated circuit of the portable device, and to store, in the actual portable device, reference templates of biometric files. According to the present invention, the reference templates are linked to the local sensor of the portable device by being combined, before storage, with the sensor identifier.

Figure 2:
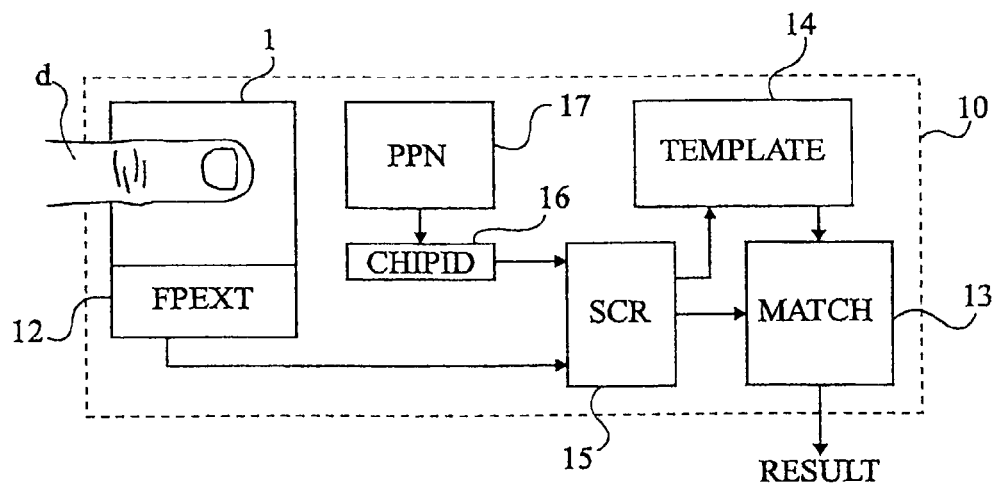
FIG. 2 shows in the form of block diagrams an embodiment of a portable device of identification by biometric data according to the present invention.

FIG. 2 very schematically shows in the form of block diagrams an embodiment of a portable device 10 of identification by comparison of biometric data. In this example, fingerprints are compared. It should however be noted that the present invention more generally applies to any type of biometric data, for example, an iris (eye pattern) recognition, provided that the obtaining and the storage of the biometric data are compatible with a localized (preferably, portable) use.

According to the present invention, a sensor 1 associated with a device 12 for extracting and digitizing (FPEXT) minutiae of the papillary arrangement of a finger d laid on sensor 1 is used. The minutia mapping or any other data file characteristic of the fingerprint (for example, the digitized image of the finger) is sent to a scrambling, encryption or, more generally, combination device 15 (SCR) specific to the present invention. On another input, device 15 receives an identifier (CHIPID) specific to an integrated circuit of device 10. Said identifier is, for example, a binary word stored (preferably, temporarily) in a dedicated register 16. Register 16 then contains the identifier only upon authentication or storage of a template.

According to the present invention, the identifier of the integrated circuit comes from a physical parameter network 17 (PPN) included in electronic device 10. Such a physical parameter network is linked to the manufacturing of an integrated circuit chip. To implement the present invention, any known physical parameter network may be used. It may be, for example, a network measuring electric parameters, for example, a measurement of a threshold voltage of a transistor, a measurement of a resistance or a stray capacitance, a measurement of the current generated by a current source, a measurement of a time constant (for example, an RC circuit), a measurement of an oscillation frequency, etc. Since these characteristics are sensitive to technological and manufacturing process dispersions, it can be considered that the electric parameter(s) taken into account are specific to a manufacturing and form a signature of the integrated circuits resulting from this manufacturing.

The signals provided by physical parameter network 17 are, if necessary, converted into digital signals to be temporarily stored in register 16 and exploitable as binary codes.

Circuits using a time measurement, for example, by measuring the read/write time of an EEPROM-type memory, may also be used as physical parameter networks. An example of a physical parameter network of this type is described in U.S. Pat. No. 5,818,738 which is incorporated herein by reference.

According to the present invention, the result provided by scrambler 15 is sent into a comparison element 13 (MATCH), or into an element 14 of storage of one or several templates. Indeed, according to the present invention, the scrambled data are compared. Accordingly, upon storage of a reference template, this storage must be performed by means of sensor 1 of portable device 10 while being scrambled by the amounts coming from physical parameter network 17. The selection between a storage in element 14 or a comparison by element 13 of the biometric signature or the like contained in element 15 depends on the phase of device use. Any means for selecting the operating mode (for example, a switch) may be envisaged.

According to the present invention, the authentication of a fingerprint and the provision of a valid result by comparator 13 require not only finger d of the user, but also the sensor with which the print has been stored as a reference. This feature of the present invention grants an increased reliability to the portable device.

Indeed, even if a pirate succeeds in obtaining the print file at the output of device 12, he can only use this file with the chip of device 10, unless which the matching (13) will never be validated since identifier CHIPID will still be missing. Further, if a pirate succeeds in obtaining the scrambled reference file in element 14, he can only use it for device 10 from which he has sampled the file. Now, to sample said file, he necessarily has damaged device 10, which is then made impossible to use. In the worst case, he can only use the file for authentication with device 10.

Preferably, the connections between elements 1, 12, and 15, 17 of device 10 are minimal in terms of distance. Preferably, all these elements are integrated in a same circuit, which eliminates any risk of piracy by access to data.

It should however be noted that even if an access is possible by a pirate, for example, on the connection of the sensor to scrambler 15, this does not enable him to restore a print template that could be subsequently authenticated. Indeed, the comparison is performed based on "scrambled" files and the pirate does not know identifier CHIPID.

According to a preferred embodiment, all elements of device 10 are placed in a chamber, secure in that the internal connections are protected against accesses from the outside by electric measurement.

An advantage of the present invention is that it applies to any type of biometric measurement and that it requires no modification of conventional algorithms exploiting such measurements.

Another advantage of the present invention is that it avoids that the print of a user is readably stored. A user then no longer risks being deterred from using such a device by the fear to have his prints malevolently reused. In particular, even knowing the template database, the original data cannot be recovered, the scrambling being a one-way operation.

Another advantage of the present invention is that by storing the combined or scrambled prints, the problem of the non-revocation of the biometric data is solved. A print scrambled according to the present invention becomes revocable. It is enough to change the sensor identifier and to restore the database.

Of course, the present invention is likely to have various alterations, modifications, and improvement which will readily occur to those skilled in the art. In particular, although the present invention has been described with an example of application to the identifying by fingerprint recognition, it also applies to the recognition of eye prints (iris recognition)

and more generally to any biometric data compatible with a sensor having a sufficiently small size to be associated with a portable device.

Further, although the present invention has been more specifically described in relation with hardware elements, it may be implemented by software means, provided that the portable device integrates the microprocessor and all the necessary peripherals (memory, result indicator, etc . . . ).

Finally, the combination of the biometrics data with an identifier specific to the integrated circuit chip may be performed by means of any physical parameter network. For example, a physical parameter extraction circuit such as described in French patent application no. 01/04586, which is incorporated herein by reference, may be used. Adapting such an extraction circuit in a portable device of the present invention is within the abilities of those skilled in the art based on the functional indications given hereabove.

Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

What is claimed is:

1. A portable device for authenticating a user based on digital biometric data, including:
   a digital biometric data sensor;
   an integrated circuit chip including a physical parameter network configured to provide an identifier specific to the integrated circuit chip, wherein the physical parameter network measures an electric parameter of the integrated circuit chip and provides the identifier based on the electric parameter, the electric parameter being a specific signature of the integrated circuit chip resulting from technological and manufacturing process variations;
   a register configured to temporarily store the identifier only upon authentication or storage of a template;
   a combining element configured to combine by a one-way scrambling operation, the identifier with currently-sensed digital biometric data provided by said digital biometric data sensor to form current combined data;
   a storage element configured to store one or several reference templates, each reference template formed by combining previously-sensed digital biometric data with the identifier using a one-way scrambling operation; and
   a comparing element configured to compare the current combined data with one of the reference templates, wherein the current combined data and the one of the reference templates remain in scrambled form during the comparison.

2. A portable device as defined in claim 1, wherein at least the physical parameter network and the combining element are integrated on the same chip.

3. A method for identification by biometric data, comprising:
   acquiring sensed biometric data with a sensor;
   deriving from a physical parameter network a chip identifier specific to an integrated circuit chip in a device common to the sensor, the physical parameter network measuring an electric parameter of the integrated circuit chip and providing the chip identifier based on the electric parameter, the electric parameter being a specific signature of the integrated circuit chip resulting from technological and manufacturing process variations;
   temporarily storing the chip identifier in a register only upon authentication or storage of a template;
   combining by a one-way scrambling operation, currently-sensed biometric data with the chip identifier to form current scrambled biometric data; and
   comparing the current scrambled biometric data with a reference template formed by combining previously-sensed biometric data with the chip identifier using a one-way scrambling operation, wherein the current scrambled biometric data and the reference template remain in scrambled form during the comparison.

4. A method as defined in claim 3, further comprising storing the current scrambled biometric data as a reference template.

5. A method as defined in claim 3, wherein acquiring sensed biometric data comprises acquiring fingerprint data.

6. A method as defined in claim 3, wherein acquiring sensed biometric data comprises acquiring iris data.

7. A portable device comprising:
   a biometric data sensor;
   an integrated circuit chip including a physical parameter network configured to provide a chip identifier specific to the integrated circuit chip, wherein the physical parameter network measures an electric parameter of the integrated circuit chip, the electric parameter being a specific signature of the integrated circuit chip resulting from technological and manufacturing process variations;
   a register configured to temporarily store the chip identifier only upon authentication or storage of a template;
   a scrambler configured to combine by a one-way scrambling operation, currently-sensed biometric data provided by the biometric data sensor with the chip identifier to form current scrambled biometric data;
   a storage element configured to store one or more reference templates including scrambled biometric data, each reference template formed by combining previously-sensed biometric data with the chip identifier using a one-way scrambling operation; and
   a comparator configured to compare the current scrambled biometric data with one of the reference templates, wherein the current scrambled biometric data and the one of the reference templates remain in scrambled form during the comparison.

8. A portable device as defined in claim 7, wherein the biometric data sensor comprises a fingerprint data sensor.

9. A portable device as defined in claim 7, wherein the biometric data sensor comprises an iris data sensor.

* * * * *